(12) United States Patent
Katsuya

(10) Patent No.: US 12,444,978 B2
(45) Date of Patent: Oct. 14, 2025

(54) COIL UNIT

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/585,099

(22) Filed: Feb. 23, 2024

(65) Prior Publication Data

US 2024/0313578 A1  Sep. 19, 2024

(30) Foreign Application Priority Data

Mar. 13, 2023 (JP) ................................ 2023-038810

(51) Int. Cl.
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC ......... H02J 50/005; H02J 50/10; B60L 53/12; H01F 5/00; H01F 38/14
See application file for complete search history.

(56) References Cited

U.S. PATENT DOCUMENTS

| | | | |
|---|---|---|---|
| 2011/0006611 A1* | 1/2011 | Baarman | H02J 50/12 307/104 |
| 2015/0214774 A1 | 7/2015 | Ema et al. | |
| 2018/0123394 A1 | 5/2018 | Ema et al. | |

FOREIGN PATENT DOCUMENTS

| | | |
|---|---|---|
| JP | 2013-153635 | 8/2013 |
| JP | 2014-117102 | 6/2014 |
| JP | 2015-139348 | 7/2015 |
| JP | 2016-103612 | 6/2016 |
| JP | 2016-105435 | 6/2016 |
| JP | 2016-127700 | 7/2016 |
| JP | 2016-213001 | 12/2016 |
| JP | 2018-018926 | 2/2018 |
| JP | 2022-012377 | 1/2022 |

OTHER PUBLICATIONS

Japanese Office Action for Japanese Patent Application No. 2023-038810 mailed Dec. 3, 2024.

\* cited by examiner

*Primary Examiner* — Daniel Cavallari
(74) *Attorney, Agent, or Firm* — Amin, Turocy & Watson, LLP

(57) ABSTRACT

A coil unit includes: a coil which transmits power to a power receiving device in a non-contact manner; a casing which accommodates the coil; and a core member that is inserted into an air core region of the coil and penetrates the casing to protrude outward, wherein the core member includes a frame-shaped wall portion which is disposed in the air core region and a lid portion which opens and closes an opening end of the wall portion.

2 Claims, 3 Drawing Sheets

COIL UNIT

CROSS-REFERENCE TO RELATED APPLICATION

Priority is claimed on Japanese Patent Application No. 2023-038810, filed on Mar. 13, 2022, the content of which is incorporated herein by reference.

BACKGROUND OF THE INVENTION

Field of the Invention

The present invention relates to a coil unit.

Description of Related Art

In recent years, research and development is being conducted on charging and supplying power to vehicles equipped with secondary batteries that contribute to energy efficiency in order to ensure more people have access to affordable, reliable, sustainable, and advanced energy.

Conventionally, in a non-contact power transmitting system that supplies power from the outside of the vehicle to the vehicle by a non-contact power transmission, a structure in which a power transmission side coil unit is buried in a travel path is known (for example, see Patent Document 1, Patent Document 2, and Patent Document 3 below).

[Patent Document 1] Japanese Unexamined Patent Application, First Publication No. 2016-105435

[Patent Document 2] Japanese Unexamined Patent Application, First Publication No. 2018-18926

[Patent Document 3] Japanese Unexamined Patent Application, First Publication No. 2022-12377

SUMMARY OF THE INVENTION

Incidentally, in the technology related to charging and supplying power in vehicles equipped with secondary batteries, it is desired to improve the maintainability of the power transmission side device while ensuring the desired charging and supplying output and efficiency. For example, in the power transmission side coil unit of the above-described related art, when a power transmitting device is buried in the travel path while being accommodated a casing, a problem arises in that various maintenance operations for power transmission side devices and members require complicated and time-consuming work.

Aspects of the present invention have been made in view of the above-described points and provide a coil unit capable of improving maintainability of power transmission side devices and members while ensuring desired charging/supplying output and efficiency. Then, these aspects contribute to energy efficiency.

In order to achieve the objects for solving the above-described problems, the present invention employs the following aspects.

(1) A coil unit according to an aspect of the present invention includes: a coil which transmits power to a power receiving device in a non-contact manner; a casing which accommodates the coil; and a core member that is inserted into an air core region of the coil and penetrates the casing to protrude outward, wherein the core member includes a frame-shaped wall portion which is disposed in the air core region and a lid portion which opens and closes an opening end of the wall portion.

(2) In Aspect (1), a surface of the lid portion may be exposed to the outside from a road surface and have higher visibility than the road surface.

(3) In Aspect (1) or (2), the coil unit may further include: a support member that supports the casing and the core member and is provided with a through-hole communicating with a hollow inner space surrounded by the wall portion.

According to Aspect (1), since the core member that improves the coupling coefficient by being disposed in the air core region of the coil includes the lid portion which opens and closes the opening end of the wall portion, the hollow inner space surrounded by the wall portion can be opened to the outside by the lid portion. Various devices and members arranged in the inner space of the wall portion or other inner spaces communicating with the inner space of the wall portion can be easily exposed to the outside and the ease of various maintenance operations can be improved.

In the case of Aspect (2), since the surface of the lid portion is exposed from the road surface to the outside, it is possible to suppress an increase in the distance between the power receiving device mounted on the moving object such as the vehicle and the coil unit, for example, compared to the case where the lid portion is buried in the travel path. Since the surface of the lid portion has higher visibility than the road surface, it is possible to easily guide the moving object such as the vehicle equipped with the power receiving device to the coil unit.

In the case of Aspect (3), since the support member provided with the through-hole communicating with the hollow inner space surrounded by the wall portion is provided, various devices and members arranged in the through-hole of the support member or other inner spaces communicating with the through-hole of the support member can be easily exposed to the outside and the ease of various maintenance operations can be improved.

DETAILED DESCRIPTION OF THE INVENTION

Hereinafter, a coil unit according to an embodiment of the present invention will be described with reference to the accompanying drawings.

Figure 1:
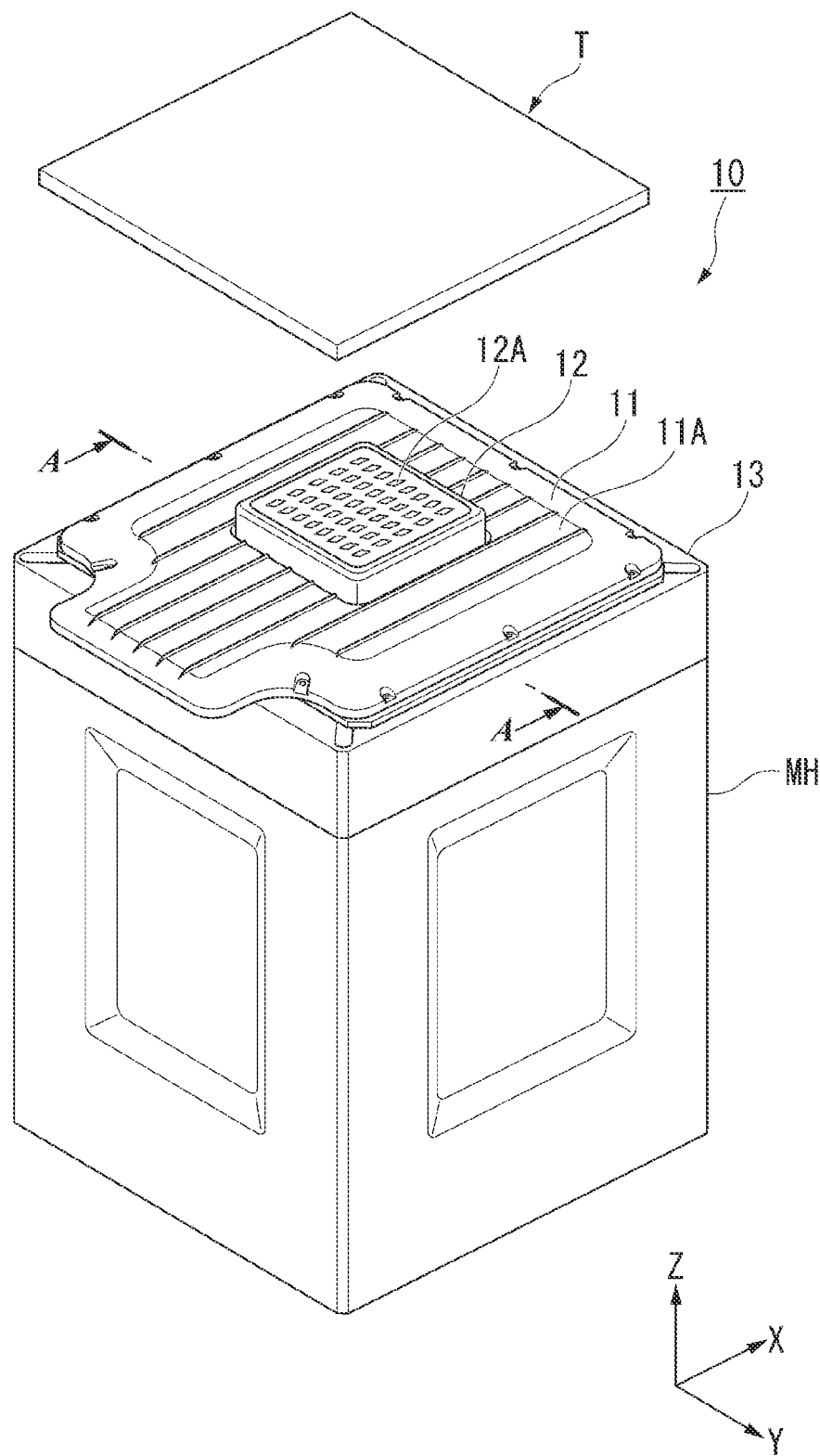
FIG. 1 is a perspective view showing a configuration of a coil unit of an embodiment of the present invention.
Figure 2:
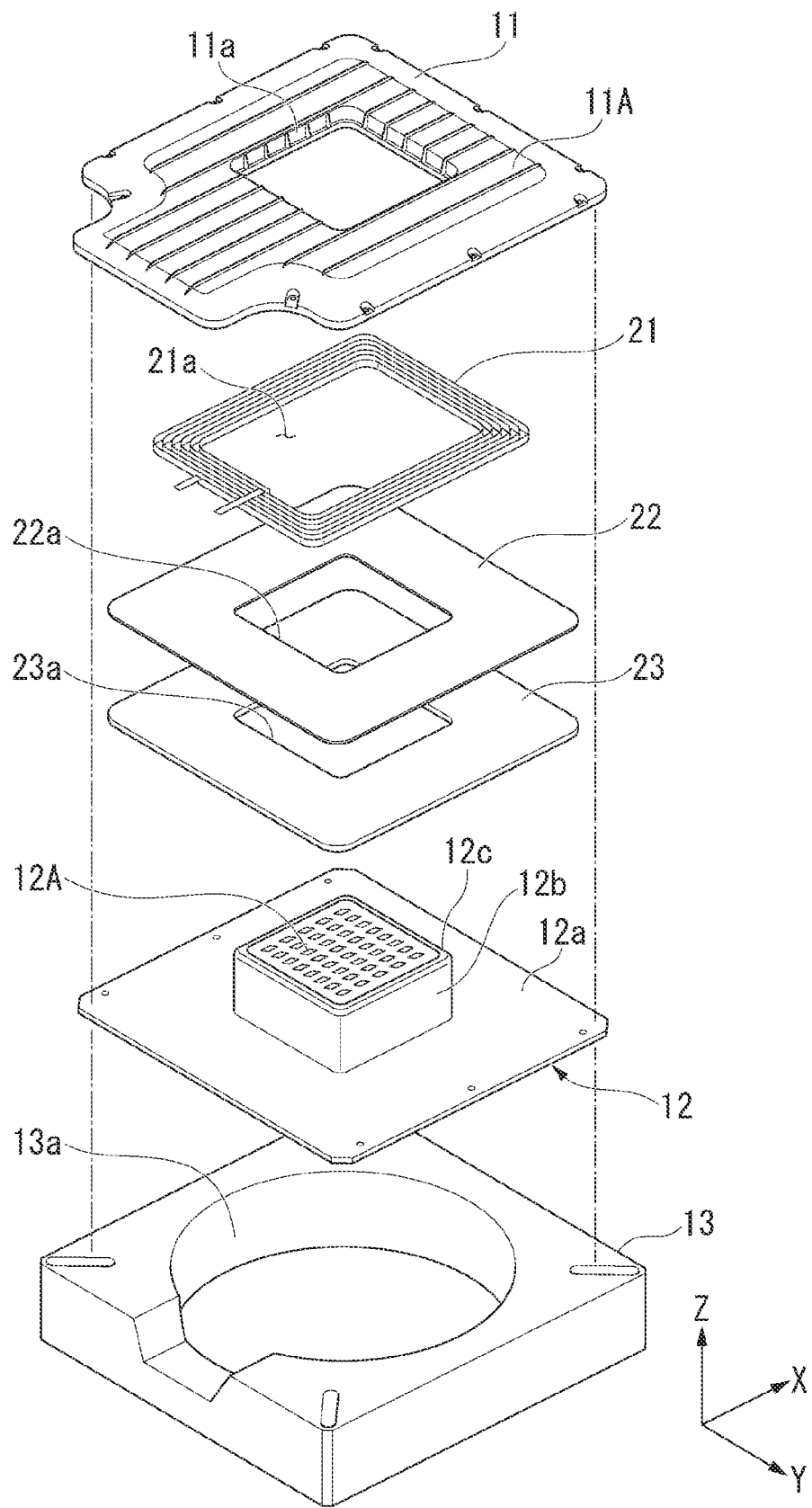
FIG. 2 is an exploded perspective view showing a configuration of the coil unit of the embodiment of the present invention.
Figure 3:
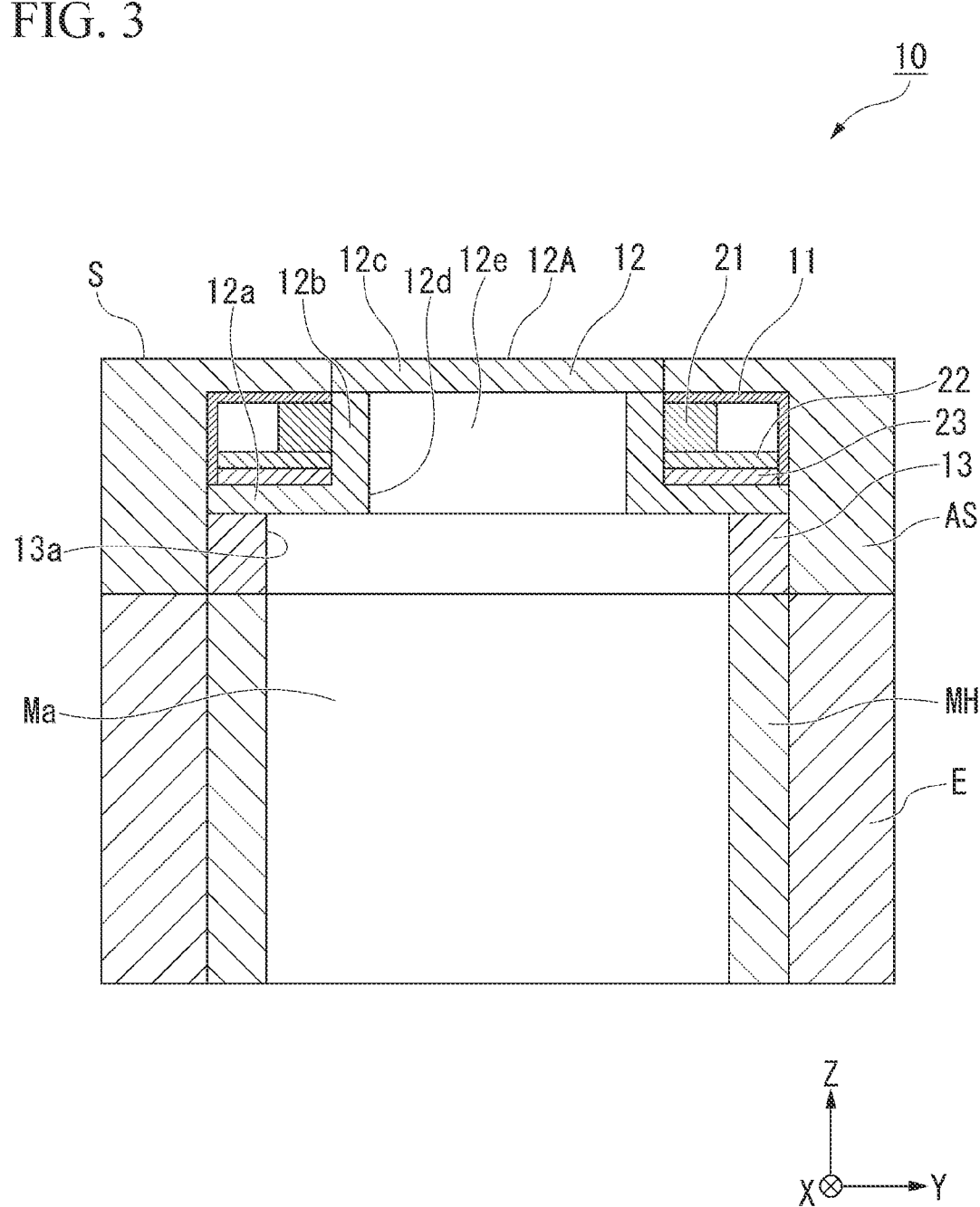
FIG. 3 is a cross-sectional view showing the coil unit of the embodiment of the present invention when cut along a YZ plane at a position of a line A-A shown in FIG. 1.

FIG. 1 is a perspective view showing a configuration of a coil unit 10 of the embodiment. FIG. 2 is an exploded perspective view showing a configuration of the coil unit 10 of the embodiment. FIG. 3 is a cross-sectional view showing the coil unit 10 of the embodiment when the coil unit of the embodiment is cut along a Y-Z plane at a position of a line A-A shown in FIG. 1.

In the following, the directions of the X, Y, and Z axes, which are orthogonal to each other in a three-dimensional space, are parallel to each axis. For example, as shown in FIGS. 1 to 3, the Z-axis direction is parallel to the up and down direction of the coil unit 10, such as the vertical direction, and the X-axis direction and the Y-axis direction are directions perpendicular to the up and down direction of the coil unit 10, such as the horizontal direction.

The coil unit 10 of the embodiment constitutes a part of a non-contact power transmitting system that supplies power from the outside of a moving object such as a vehicle to a power receiving device T of the moving object by, for example, non-contact power transmission. The coil unit 10 of the embodiment is provided in, for example, a power transmitting device installed on a travel path of a vehicle or the like.

The coil unit 10 of the embodiment is disposed, for example, above a square tubular manhole MH buried underground in the travel path of the vehicle or the like. The inner space of the manhole MH accommodates, for example, various devices and members that constitute the power transmitting device of the non-contact power transmitting system.

As shown in FIGS. 1, 2, and 3, the coil unit 10 includes, for example, a casing 11, a core member 12, a support member 13, a coil 21, an insulating member 22, and a ferrite core 23.

The outer shape of the casing 11 is, for example, a rectangular frame shape. The casing 11 is provided, for example, to surround the coil 21, the insulating member 22, and the ferrite core 23 to be described later on the upper side in the up and down direction and on the inner and outer sides in a direction perpendicular to the up and down direction. The casing 11 accommodates the coil 21, the insulating member 22, and the ferrite core 23 to be described later.

The core member 12 includes, for example, a plate-shaped portion 12a, a wall portion 12b, and a lid portion 12c. The core member 12 is made of a magnetic material such as an electromagnetic steel plate like a silicon steel plate. The outer shape of the plate-shaped portion 12a is, for example, a rectangular frame shape in which a through-hole 12d is formed to penetrate the center portion in the thickness direction. For example, when the plate-shaped portion 12a is disposed to be laminated on the lower side of the casing 11 in the up and down direction, an accommodation space is formed between the plate-shaped portion and the inner surface of the casing 11 so that the coil 21, the insulating member 22, and the ferrite core 23 are accommodated therein.

The outer shape of the wall portion 12b is, for example, a rectangular frame shape which protrudes upward in the up and down direction from the peripheral edge surrounding the through-hole 12d of the plate-shaped portion 12a. The wall portion 12b is disposed in an air core region 21a of the coil 21 and each of through-holes 22a and 23a of the insulating member 22 and the ferrite core 23 to be described later. The wall portion 12b is inserted into a through-hole 11a of the casing 11 to protrude upward from an upper surface 11A of the casing 11.

The outer shape of the lid portion 12c is, for example, a rectangular plate shape. The lid portion 12c opens and closes the upper opening end of the wall portion 12b. An upper surface 12A of the lid portion 12c is formed to have higher visibility than a road surface S of the travel path on which the coil unit 10 is provided, for example, by using at least one of appropriate coloring, patterning, displaying, and the like.

The outer shape of the support member 13 is, for example, a rectangular plate shape in which a through-hole 13a is formed in the thickness direction. The support member 13 is disposed, for example, at the upper portion of the manhole MH and supports the casing 11 and the core member 12.

The outer shape of the coil 21 is, for example, a spiral shape along the inner surface of the casing 11.

The outer shape of the insulating member 22 is, for example, a rectangular sheet shape in which the through-hole 22a is formed in the thickness direction. The insulating member 22 is made of an electrically insulating material. The outer shape of the ferrite core 23 is, for example, a rectangular plate shape in which the through-hole 23a is formed in the thickness direction.

The coil 21, the insulating member 22, and the ferrite core 23 are sequentially laminated in the up and down direction and are arranged inside the casing 11.

As shown in FIG. 3, the coil unit 10 is disposed, for example, above the manhole MH buried underground E, and is fixed by a paving material AS such as concrete or asphalt that forms the travel path of the vehicle or the like. The coil unit 10 is disposed, for example, so that the road surface S of the travel path and the upper surface 12A of the lid portion 12c of the core member 12 form the same plane.

In the coil unit 10, a hollow inner space 12e surrounded by the wall portion 12b of the core member 12, the through-hole 13a of the support member 13, and an inner space Ma of the manhole MH communicate with each other. For example, when the lid portion 12c of the core member 12 is removed so that the upper opening end of the wall portion 12b is opened, the through-hole 13a of the support member 13 and the inner space Ma of the manhole MH are opened to the outside. For example, when the upper opening end of the wall portion 12b is opened, the lid portion 12c of the core member 12 exposes various devices and members that constitute the power transmitting device of the non-contact power transmitting system accommodated in the inner space Ma of the manhole MH to the outside.

As described above, according to the coil unit 10 of the embodiment, since the core member 12 that improves the coupling coefficient by being disposed in the air core region 21a of the coil 21 includes the lid portion 12c which opens and closes the upper opening end of the wall portion 12b, the hollow inner space 12e surrounded by the wall portion 12b can be opened to the outside by the lid portion 12c. Various devices and members arranged in the inner space 12e of the wall portion 12b or other inner spaces communicating with the inner space 12e of the wall portion 12b can be easily exposed to the outside and the ease of various maintenance operations can be improved.

Since the support member 13 provided with the through-hole 13a communicating with the hollow inner space 12e surrounded by the wall portion 12b is provided, various devices and members arranged in the through-hole 13a of the support member 13 or other inner spaces communicating with the through-hole 13a of the support member 13 can be easily exposed to the outside and the ease of various maintenance operations can be improved.

Since the inner space 12e of the wall portion 12b, the through-hole 13a of the support member 13, and the inner space Ma of the manhole MH communicate with each other, maintainability can be improved, for example, even when various devices and members that constitute the power transmitting device of the non-contact power transmitting system are accommodated in the inner space Ma of the manhole MH.

Since the upper surface 12A of the lid portion 12c is exposed from the road surface S to the outside, it is possible to suppress an increase in the distance between the power receiving device mounted on the moving object such as the vehicle and the coil unit 10, for example, compared to the case where the lid portion 12c is buried in the travel path. By suppressing an increase in magnetic path length, it is possible to improve the output and efficiency of non-contact power transmission.

Since the upper surface 12A of the lid portion 12c has higher visibility than the road surface S, it is possible to easily guide the moving object such as the vehicle equipped with the power receiving device to the coil unit 10. For example, in the case of a moving object equipped with a device that detects the lane markings and the like of the travel path and controls driving support, the upper surface 12A of the lid portion 12c can be detected with high accuracy. Since it is possible to improve the accuracy of alignment between the power receiving device mounted on the moving object and the coil unit 10, it is possible to improve the output and efficiency of non-contact power transmission.

The embodiments of the present invention are presented by way of example and are not intended to limit the scope of the invention. These embodiments can be implemented in various other forms, and various omissions, substitutions, and changes can be made without departing from the gist of the invention. These embodiments and their modifications are included within the scope and gist of the invention as well as within the scope of the invention described in the claims and its equivalents.

What is claimed is:

1. A coil unit comprising:
   a coil which transmits power to a power receiving device in a non-contact manner;
   a casing which accommodates the coil;
   a core member that is inserted into an air core region of the coil and penetrates the casing to protrude outward,
   wherein the core member includes a frame-shaped wall portion which is disposed in the air core region and a lid portion which opens and closes an opening end of the wall portion; and
   a support member that supports the casing and the core member and is provided with a through-hole communicating with a hollow inner space surrounded by the wall portion.

2. The coil unit according to claim 1,
   wherein a surface of the lid portion is exposed to the outside from a road surface and has higher visibility than the road surface.

* * * * *